United States Patent [19]
Nelson

[11] Patent Number: 4,460,907
[45] Date of Patent: Jul. 17, 1984

[54] ELECTROGRAPHIC IMAGING APPARATUS

[75] Inventor: Kerry S. Nelson, Shoreview, Minn.
[73] Assignee: Minnesota Mining and Manufacturing Company, St. Paul, Minn.

[21] Appl. No.: 388,583
[22] Filed: Jun. 15, 1982
[51] Int. Cl.³ ....................... G01D 15/06; G03G 15/00
[52] U.S. Cl. ................................ 346/153.1; 355/3 R
[58] Field of Search ............................ 346/153.1, 74.2; 355/3 R; 358/300-302

[56] References Cited

U.S. PATENT DOCUMENTS 3,343,142 9/1967 Clark ....................................... 355/6
3,641,585 2/1972 Hodges .............................. 346/74.2
3,816,840 6/1974 Kotz ................................. 346/153.1
4,046,471 9/1977 Branham et al. ..................... 355/14
4,124,286 11/1978 Barasch ................................... 355/3
4,167,324 9/1979 Wu ....................................... 355/3 R
4,277,805 7/1981 Sato .................................... 358/286
4,380,383 4/1983 Daintrey et al. .................. 355/3 R

*Primary Examiner*—Thomas H. Tarcza
*Attorney, Agent, or Firm*—Donald M. Sell; James A. Smith; Robert L. Marben

[57] ABSTRACT

Electrographic imaging apparatus which includes a portion for producing an unfixed or nonpermanent toner powder image on a first receptor in accordance with electrical signals, a second portion for providing a light image from the toner powder image with a third portion operated to carry out an electrophotographic process for producing a permanent image on a second receptor. The third portion includes a photoconductive member which receives the light image from the second portion to provide a latent image that is developed and transferred to the second receptor to provide the permanent image.

6 Claims, 6 Drawing Figures

FIG. 2
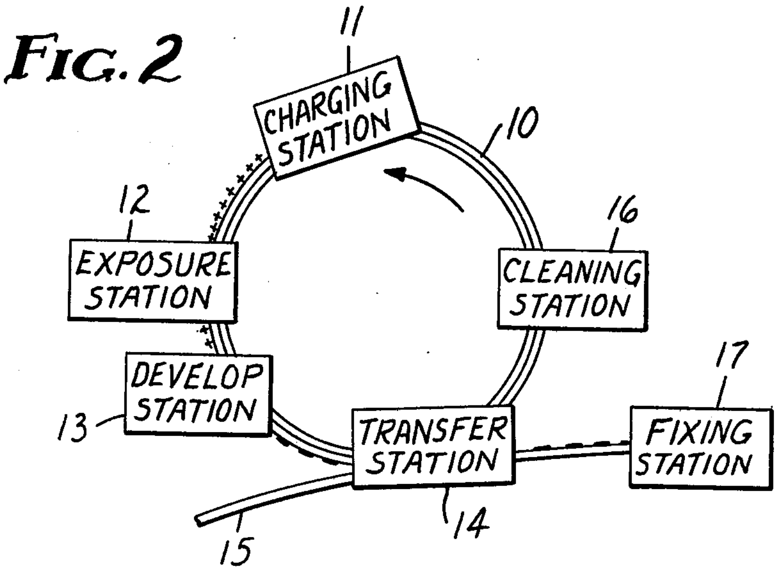
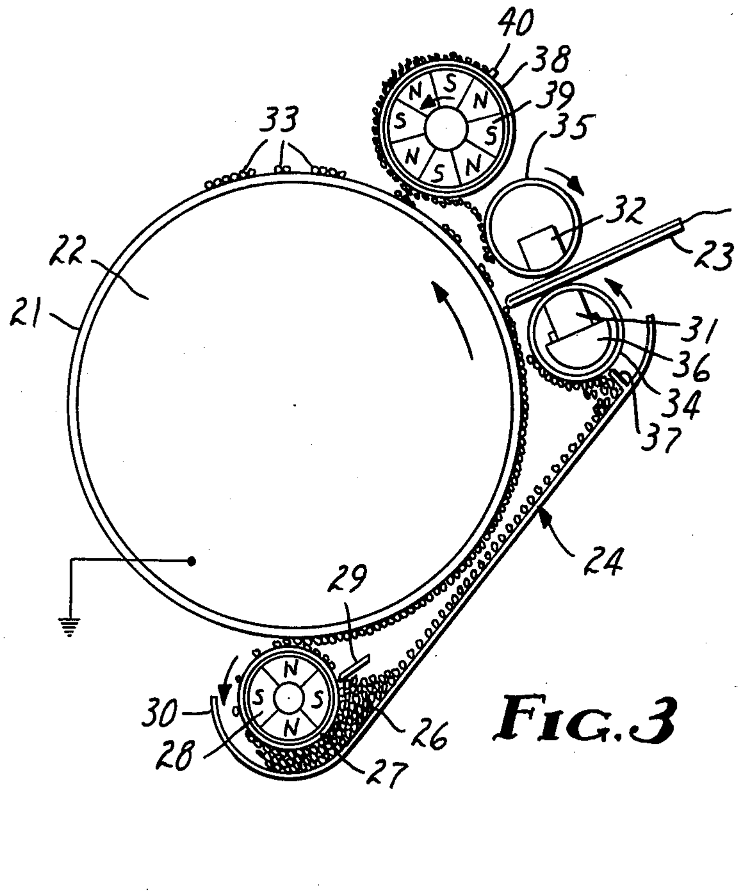
FIG. 3

ELECTROGRAPHIC IMAGING APPARATUS

BACKGROUND OF THE INVENTION

1. Field of the Invention

This invention relates to the field of electrographic imaging apparatus and more particularly to apparatus for producing an unfixed or nonpermanent toner powder image on a first receptor in accordance with electrical signals and including optics for providing a light image of such toner powder image as the light image input to a portion of the apparatus which carries out an electrophotographic process to provide a permanent image on a second receptor in accordance with the light image input.

2. Prior Art

U.S. Pat. No. 3,816,840 to Arthur R. Kotz discloses an electrographic recording process and apparatus using conductive toner powder and providing for the direct deposition of toner particles at the surface of a receptor in accordance with electrical signals applied to a stylus electrode while toner is present between the stylus electrode and the receptor. In order to use such process and apparatus to form a copy of the toner powder image on plain paper it is necessary to transfer the toner powder image from the receptor to paper and then fix the toner powder to the paper. It has been found that normal electrical or electrostatic transfer of the toner image to paper, due in part to the conductivity of the toner, is not sufficiently efficient to provide an image on the paper that is consistently of a quality comparable to other commercially available copying apparatus using electrical signals as an input for determining the image to be produced. The transfer problem is compounded by the fact that plain paper generally becomes more conductive as the relative humidity increases. This permits rapid charge interchange between toner powder and the paper surface and causes the attractive transfer force on the toner particles to be generally low and variable as a function of time. High humidity, therefore, generally results in loss in the transferred image of both image edge sharpness and density.

The process and apparatus disclosed in the patent to Kotz have a number of features which are desirable. It allows electrographic recording to be carried out at very high speeds using low voltage and low current for the styli. The low voltage allows the use of low voltage transistors and integrated circuits which is advantageous and in addition the very low current means that the power required to record information is very low though extremely high speeds may be involved. In addition, the Kotz process and apparatus also allows a continuous range of optical densities to be recorded. Such features and advantages together with the fact that the Kotz process can also be used to provide high resolution images in accordance with electrical input signals makes it desirable that the apparatus and process be used in a manner that avoids the transfer problems mentioned.

SUMMARY OF THE INVENTION

The present invention provides apparatus for obtaining very high quality permanent images when using the electronic imaging process and apparatus of the prior art Kotz patent. The apparatus of the present invention uses the process and apparatus of the Kotz patent to the extent needed to create unfixed toner images on a first receptor member. Such unfixed toner images are optically transmitted to another portion of the apparatus having a photoconductive member at which a latent electrostatic image of the unfixed toner image is produced and is used to provide a permanent image on a second receptor member in accordance with the latent image.

The use of optical coupling in place of direct physical transfer of the unfixed toner images to a second receptor member allows a number of the desirable features and advantages of the prior art Kotz patent to be retained and provides some significant overall improvements. These include the production of permanent images that have sharper edges and are of higher density than can be readily obtained by a direct transfer of the unfixed toner image to a second receptor. It also allows permanent images to be produced on receptor members such as plain paper which retain a high quality level independent of relative humidity variations. In addition, by using reduction optics in the optical transmission of the unfixed toner image, permanent images can be produced that have a resolution in excess of 400 lines per inch. The use of reduction optics also serves to decrease the density of styli required to obtain a high resolution permanent image thereby providing for more cost effective manufacture of the styli array.

Electrostatic enhancement is achieved by optical projection of the unfixed toner images to a photoconductive member since variations in toner density and backgrounding that could be introduced when creating the unfixed toner image on the first receptor can be compensated for allowing greater operating latitude in the apparatus and the process carried out by the apparatus. In addition, fewer boundary conditions need be imposed on the toner powder and receptor specifications used with the portion of the apparatus using the prior art Kotz process since the toner powder and receptor need only be optimized to satisfy an imaging function, as there is no physical transfer of the unfixed toner image produced using the prior art Kotz process.

Broadly, the present invention provides an apparatus for producing a permanent image which includes a first receptor member; means for producing an unfixed or nonpermanent toner powder image on the first receptor member; means, including a photoconductive member, for producing a permanent image on a second receptor using a latent image resulting from a light image directed to the photoconductive member and means adapted for producing a light image of an unfixed toner powder image present at the first receptor and directing it to the photoconductive member. The portion of the invention which requires a means, including a photoconductive member, for producing a permanent image on a second receptor member using a latent image resulting from a light image directed to the photoconductive member can be provided by any one of a number of electrophotographic office copiers that are presently available. It is preferred that the first receptor member and means for producing an unfixed toner powder image on the first receptor member be apparatus based on the prior art patent to Kotz mentioned above. Accordingly, the preferred form for the means for producing an unfixed toner powder image on the first receptor member includes a stylus array adapted for receiving electrical signals wherein one end portion of each stylus is positioned a short distance from the receptor with a toner powder supply means adapted for providing toner powder to the space between the styli array and the first receptor member. The toner powder at the first receptor member opposite a stylus of the styli array responds to an electrical signal applied to such stylus to cause such toner powder to be attracted to the first receptor member. The means for producing an unfixed toner powder image on the first receptor member also includes means for removing toner powder from the first receptor member that is not attracted to it in response to electrical signals applied to the styli array whereby the toner powder remaining on the first receptor member provides an unfixed toner powder image.

Another embodiment of the present invention has the means adapted for producing a light image of an unfixed toner powder image on the first receptor member arranged to produce a light image that is a reduction of the unfixed toner powder image. This results in the production of a permanent image on the second receptor member that has a resolution that is greater than the resolution of the unfixed toner powder image. This is desirable since it simplifies the construction and therefore the cost of the stylus array.

Another embodiment of the invention has an additional means for receiving an image bearing sheet with such means operable to project a light image of the image bearing sheet onto the photoconductive member. Such an arrangement allows the apparatus to provide a permanent image on the second receptor member which is derived from the image bearing sheet or from an unfixed toner powder image.

The first receptor member and photoconductive member of the apparatus of the present invention can be provided in the form of a cylindrical drum or flexible belt. When each is in the form of a flexible belt, the means for producing a light image of an unfixed toner powder image at the first receptor member can be adapted to produce a light image of the unfixed toner powder image in a full frame manner and can be so received at the photoconductive member. Such an arrangement permits multiple copies of an unfixed toner powder image on the first receptor to be readily made without refreshing the unfixed toner powder image since the receptor bearing a desired unfixed toner powder image can remain in place with multiple full frame light images of such toner powder provided to the electrophotographic portion of the apparatus for production of the desired number of copies of the unfixed toner powder image.

BRIEF DESCRIPTION OF THE DRAWINGS

A better understanding of this invention including its novel features and advantages will be obtained upon the consideration of the following detailed description and the accompanying drawings which sets forth various embodiments of the invention, and wherein

FIG. 2 is schematic showing of a portion of the apparatus of FIG. 1;

FIG. 3 is a more detailed diagrammatic showing of a portion of the apparatus of FIG. 1;

DETAILED DESCRIPTION

Figure 1:
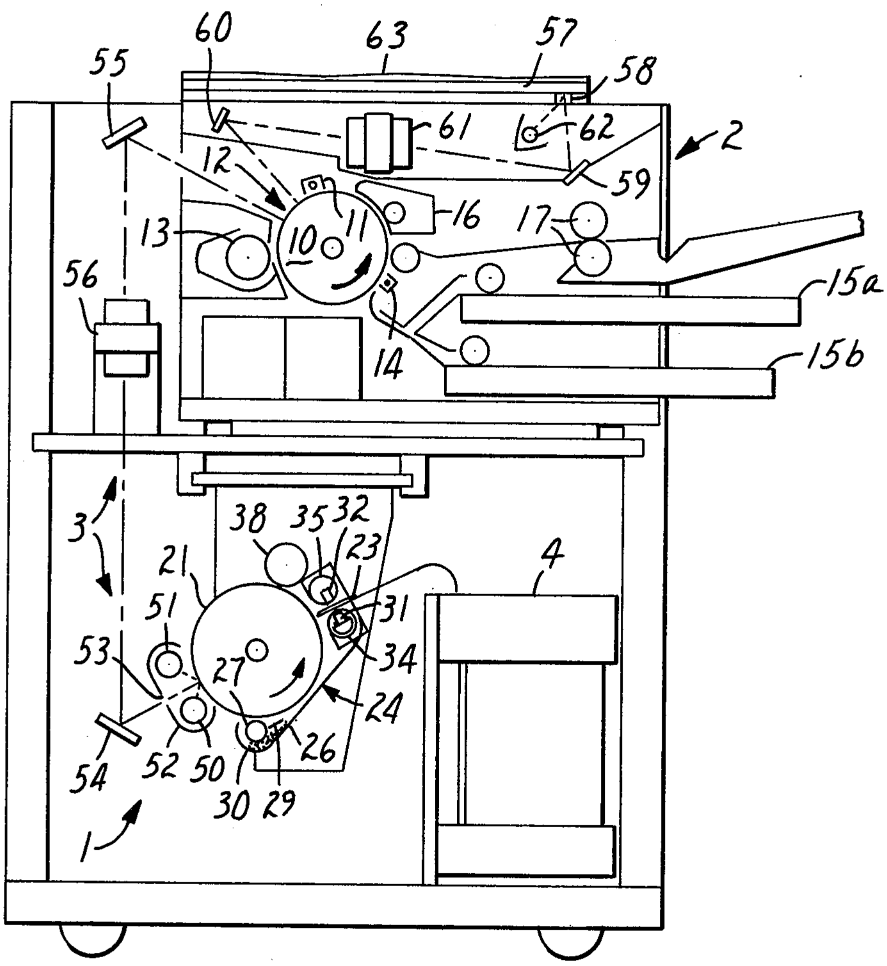
FIG. 1 is a diagrammatic showing of an apparatus according to the present invention.

Referring to FIG. 1, apparatus is diagramatically shown which embodies the present invention. The apparatus at FIG. 1 includes a portion 1 which utilizes the teachings of U.S. Pat. No. 3,816,840 to Arthur R. Kotz to produce an unfixed or nonpermanent toner powder image at a first receptor member 21 in accordance with electrical input signals. Another portion 2 of the apparatus of FIG. 1 is an electrophotographic apparatus which has a photoconductor member 10 and functions to produce a permanent image on a second receptor member using a latent image resulting from a light image directed to the photoconductive member. Another portion 3 of the apparatus of FIG. 1 serves to produce a light image of an unfixed toner powder image produced on the first receptor member 21 of portion 1 and directs such light image to the photoconductive member 10 of portion 2 for the production of a permanent image on a second receptor member in accordance with the light image.

There are many plain paper office copiers of the electrophotographic type which can be used to provide portion 2 of the apparatus of FIG. 1. In the case of FIG. 1, the portion 2 depicts a Model 545 office copier that is commercially available from Minnesota Mining and Manufacturing Company, Saint Paul, Minn., and is only one example of how a commercially available office copier can be utilized to provide the portion 2 of the apparatus in FIG. 1.

FIG. 2 is a schematic showing of the various portions representative of a large number of electrophotographic office copiers for carrying out a process for producing an image on a second receptor member, such as paper or transparent sheet material, where the input to the office copier is a light image that is normally obtained from an original graphic. Such showing is also applicable to portion 2 of FIG. 1. The apparatus of FIG. 2 includes a photoconductive drum 10 that is rotatable counterclockwise. Positioned about the photoconductive drum are a sensitizing or charging station 11 which serves to electrostatically deposit a uniform electrical charge of a predetermined polarity on the photoconductive drum 10; an exposure station 12 at which a light image is directed to the photoconductive drum 10 to produce a latent image charge pattern on the photoconductive drum 10 in accordance with the light image; a development station 13 to provide toner powder to the photoconductive drum 10 to develop the charge pattern; a transfer station 14 to electrostatically transfer the toner powder deposited per the charge pattern to a second receptor member, such as a plain paper sheet 15 and a cleaning station 16 to clean and recondition the photoconductive drum for repeat cycling. Details are not provided with respect to the various functioning stations positioned about the photoconductive drum 10 as these can take on a number of suitable forms well known in the electrophotographic copy machine art.

While the photoconductive member 10 is shown in drum form it is well known that this can take the form of a flexible sheet, a discontinuous web or a continuous photoconductive belt. The photoconductive member 10 is adapted to be rotated at a constant linear surface speed past the charging station 11 and then the exposure station 12 so that prior to reaching the developement station 13, the photoconductive member 10 has an electrical charge pattern which is at a high level in the non-light struck areas and is at a much lesser level in the light struck areas. The magnitude and polarity of the electrical charge present at the photoconductive member is dependent on the photoconductor used and the level to which it is initially charged at the charging station 11. The development station 13 serves to deposit toner powder in the non-light struck areas, the degree of deposition being dependent on the level of the electrical charge in such areas. Relatively little toner powder deposition occurs in the low potential or non-light struck regions of the photoconductive member 10. The toner powder particles deposited on the photoconductive member 10 are electrostatically transferred to a plain paper sheet 15 by using an electrostatic charge provided at the transfer station. Such electrostatic charge is of the same polarity as the charge presented at the photoconductor to attract the toner powder to the photoconductive member 10 and is applied to the side of the paper away from the toner image. The electrophotographic apparatus depicted in FIG. 2 also includes a fixing station 17 through which the paper 15 bearing the toner powder image passes and serves to fix the toner powder to the paper sheet. Fixing of the toner powder image to the paper can be carried out by the application of pressure, or heat or a combination of pressure and heat to the paper 15.

FIG. 3 is a more detailed showing of the major part of portion 1 of FIG. 1. The structure of FIG. 3 includes a receptor member 21 comprised of a coating of dielectric material on the outer surface of an electronically conductive drum 22 that is connected to electrical ground and is arranged to rotate counterclockwise about its axis, as indicated in FIG. 3, by a drive means, which includes an electric motor (not shown). The apparatus of FIG. 3 is useable with magnetically attractable, electronically conductive toner powder. The stylus electrode 23 shown is one of an array of spaced apart, parallel stylus electrodes. The electrodes 23 are preferably comprised of magnetically permeable material. The stylus array is positioned generally perpendicular to and a relatively short distance away from the receptor member 21 with the tip or end portion of the stylus electrodes parallel to the receptor member 21. The recording gap, i.e., the shortest distance between the stylus electrode tips and the receptor member 21 should, as a minimum, be at least equal to the diameter of the largest toner particle of the toner powder to be used. As a practical matter, the gap preferably should be large enough so a plurality of toner particles, forming at least one elongated toner chain-like aggregate, can be accommodated in the gap thereby insuring a suitable electronically conductive path between the tip of each stylus electrode 23 and the receptor member 21. In general, the closer the spacing between adjacent stylus electrodes the smaller the toner particles and the smaller the recording gap should be for a particular situation.

Figure 4:
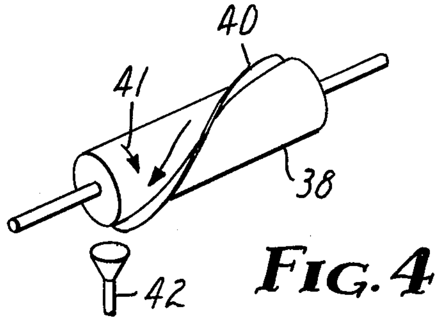
FIG. 4 is a perspective view of one part of the apparatus of FIGS. 1 and 3.

A toner powder supply means 24 is included for providing a uniform or regular layer of magnetically attractable, electronically conductive toner 26 to the receptor member 21. It includes a magnetic roll type of toner applicator spaced a short distance from receptor member 21. The applicator has an electronically conductive shell 27 with one or more stationary magnets 28 mounted within the shell 27. Applicators of this type are well known and commercially available. The shell 27, as indicated in FIG. 3, is rotated counterclockwise at a speed sufficient to supply toner powder 26 to a doctor blade 29 and thence to receptor member 21 from a toner supply hopper indicated generally at 30. The doctor blade 29 serves to meter the amount of toner 26 that is carried by the shell 27 toward the receptor member 21. The shell 27 is electrically connected to a d.c. voltage source (not shown) of a magnitude sufficient to cause the toner to be electrically charged and adhere to the surface of the receptor 21 which then carries the toner powder on receptor 21 into the recording region at the tips of the stylus electrodes 23 by the counterclockwise rotation of the drum 22. During the time the toner powder moves with the receptor member 21 to the recording region of stylus electrodes 23, the charge on the toner decreases due to controlled charge leakage into the receptor member 21. The toner brought to the recording region is acted upon by a magnetic force present at the recording region to form chain-like aggregates of toner particles on the styli tips which bridge the recording gap. The magnetic force present at the recording region is provided by magnets 31 and 32 which are positioned on opposite sides of the stylus array 23. The stylus electrodes 23 are selectively connected individually to sources of recording electrical signals capable of providing voltage pulses of suitable amplitude and duration in accordance with a desired toner powder image. Referring to FIG. 1, the electronics needed for providing such recording electrical potentials is indicated at 4. Image defining control signals are applied to the electronics 4 from an external source (not shown). The toner powder is deposited onto the receptor member 21 in an image-wise manner opposite the tips of those stylus electrodes to which a recording electrical potential with respect to the drum 22 is applied. Such recorded image toner is bound to the receptor member 21 by electrical forces which exceed the magnetic forces in the recording region. In this sense, this toner is again associated with the receptor member 21 and is moved by further rotation of the drum 22 out of the recording region, as indicated by the toner powder at 33. When a stylus electrode is not supplied with a recording electrical potential, no toner powder is deposited in the areas of the recording surface opposite such electrode, i.e., the toner remains magnetically attracted toward such stylus electrode. The toner chains at non-recording styli do not require replenishment so the incoming supply of toner powder creates an excess of toner. Such excess toner is moved out of the recording region and out of electronic contact with the toner at the gap by the action of magnet 31 and the counterclockwise rotation of cylindrical member 34 which encloses the magnet 31 plus the action of magnet 32 and clockwise rotation of cylindrical member 35 which encloses the magnet 32. A piece of ferromagnetic material 36, for example cold-drawn steel, is positioned and bonded to the magnet 31 in such a manner as to make the toner particles less attractable to the cylindrical member 34 as it rotates counterclockwise to carry the toner away from the recording region to a toner remover blade 37 which serves to remove the toner particles from the cylindrical member 34. The toner powder removed in this manner falls back into the hopper 30 for further use. A fixed or non-rotating cylindrical background remover shell 38 is positioned near the clockwise rotating cylindrical member 35. A rotatable magnetic roll 39, positioned within the shell 38 and arranged for rotation counterclockwise, provides a magnetic force of sufficient strength to remove the toner powder that is carried on the cylindrical member 35 as it moves clockwise. The background remover shell 38 is also positioned a short distance from the receptor member 21 to provide a magnetic force adjacent receptor member 21 that is only of sufficient strength to remove any non-imaging or background toner that may be present from the receptor member 21 leaving the image-wise deposited toner at 33 on the receptor member 21. The toner image represented by the toner powder at 33 moves with the drum 22 as it continues to rotate in a counterclockwise direction. The magnet roll 39 structure is well known and is made up of a number of magnet sectors which present alternate magnetic poles adjacent the shell 38. Rotation of the magnet roll 39 in a counterclockwise direction causes the toner powder attracted to the shell 38 to move in a clockwise direction about the shell 38. Referring to FIG. 4, further details relating to the shell 38 are shown wherein a dam or flange 40 is positioned at its surface. The flange 40 blocks the path of movement of the toner powder about the shell 38, as indicated by the arrow 41. The toner powder accumulates at flange 40 and moves along flange 40 to a trough or conduit 42 that is provided which directs the toner powder back to the toner hopper 30 for further use.

Referring to FIG. 3, it can be seen that the unfixed toner image 33, which moves with receptor member 21 from the vicinity of the background remover shell 38 to the shell 27 of the toner supply means 24, is accessible so it can be optically scanned. As in the case of movement of the toner powder from the shell 27 of the toner supply means 24 to the recording region, the charge on the toner making up the toner powder image 33 decreases due to controlled charge leakage into receptor member 21 during the time the toner powder image 33 moves from the recording gap at the stylus electrode array to the shell 27 of the toner supply means 24.

Up to this point, the portion 2 of FIG. 1 which includes a photoconductive member for producing a permanent image on a receptor, such as paper, using a latent image resulting from a light image directed to the photoconductive member has been described in connection with FIG. 2. The various functioning stations identified in connection with FIG. 2 plus the photoconductive member 10 are identified in FIG. 1 using the same reference numerals as are used in FIG. 2 for such functioning stations. The receptor used in connection with the portion 2 of FIG. 1 is paper on which the permanent toner image is fixed. The paper is supplied from either of two paper supply trays 15*a* and 15*b* which are used to house different size paper sheets.

The portion 1 of FIG. 1, which has a receptor member 21 and functions to provide an unfixed toner image on the receptor using the teachings of U.S. Pat. No. 3,816,840 to Arthur R. Kotz, has also been described in detail in connection with FIGS. 3 and 4. Those items identified in connection with FIGS. 3 and 4 which are present in FIG. 1 are identified using the same reference numerals as are used in FIGS. 3 and 4.

What remains to be described of the apparatus of FIG. 1 is the portion 3 which serves to produce a light image of an unfixed toner powder image produced at the receptor member 21 of portion 1 and direct such light image to the photoconductive member 10 of portion 2 of the apparatus of FIG. 1 which uses such light image to produce a permanent image of such light image on plain paper. The portion 3 includes means for providing light energy that is directed to the receptor member 21 at an area where the receptor member 21 carries the unfixed toner image between the background remover shell 38 and the shell 27 of the toner supply means 24. Since optical transfer or projection of the unfixed toner image at the receptor member 21 is used, it can be appreciated that the color and texture of the receptor member 21 should be selected so sufficient optical contrast is obtained with respect to the unfixed toner image. Thus, a white receptor member 21 can be used with white light illumination while a red receptor can be used with red light illumination. In this embodiment, two electrically operative light sources 50 and 51 provide such light energy. A reflector 52 positioned to direct the light energy from the light sources 50 and 51 is provided and is arranged to define an elongate slit 53 through which light reflected from the receptor member 21 can pass. The portion 3 also includes mirrors 54 and 55 positioned to direct the light from slit 53 to the photoconductor 10 with a lens system 56 interposed between mirrors 54 and 55 to focus the light image passed from the slit 53 onto the photoconductor 10 of portion 2. Mirror 54 is positioned to receive the light passed from slit 53 and direct it to the lens system 56 while mirror 55 is positioned to receive the light passed from lens system 56 and direct it to the photoconductive member 10 to complete a line scan of the unfixed toner powder image at receptor member 21.

Operation of the apparatus of FIG. 1 will now be described. Toner powder 26 is placed on the receptor member 21 by the shell 27 of the toner supply means 24, as has been described, and is carried by counterclockwise movement of the receptor to the recording gap between the tips of the styli in the stylus array 23 and the receptor member 21. Electrical signals from the electronic circuitry 4 are selectively applied to the individual stylus electrodes of the stylus array 23 causing toner powder opposite an energized stylus electrode to be held on the receptor member 21 by a charge produced on such toner powder. Toner powder that is not influenced by the application of electrical signals to the various stylus electrodes is returned to the toner hopper 30 by the action of the magnets 31 and 32 on such toner powder and the rotation of the cylindrical members 34 and 35 associated with magnets 31 and 32, respectively. Toner attracted to cylinder 35 is returned to the toner hopper 30 via the background remover shell 38 about which the toner is carried in response to rotation of the magnetic roll 39 positioned within the shell 38 as has been explained.

The toner not removed is retained on the receptor member 21 presenting an unfixed toner image that is moved past the slit 53 provided by reflector 52 which directs light from the light sources 50 and 51 toward the receptor member 21. The light reflected is a light image of the toner powder image on receptor member 21. The light image transmitted by the slit 53 as the toner powder image is moved with receptor member 21 is directed by mirror 54 to the lens system 56. The light transmitted by the lens system 56 is directed by mirror 55 to the photoconductive member 10. The movement of the photoconductive member 10 and the receptor member 21 are coordinated so the light image is directed to the photoconductive member 10 at a portion to which a uniform charge has been applied at the charging station 11. The linear surface speed of the photoconductive member and the receptor member 21 is the same when a 1:1 relationship between the unfixed toner image and the light image impinging on the photoconductive member 10 is desired. The light image directed to the uniformly charged photoconductive member 10 discharges the photoconductive member in accordance with the light images to cause a latent charge image or pattern to be formed at the photoconductive member 10.

As the optical scan of the toner image at the receptor member 21 proceeds, the latent charge image or pattern produced at the photoconductive member 10 is subsequently presented to the development station 13 where toner powder is deposited on the photoconductive member in accordance with the latent charge image. The photoconductive member 10 then carries the toner developed image to the transfer station 14 where the toner developed image is transferred to a paper sheet presented to the transfer station 14 from either of the paper storage trays 15*a* and 15*b*. The paper sheet with the unfixed toner powder image is then moved to the fixing station 17 where the toner powder image is fixed to the paper. The photoconductive member 10 continues its movement to move the photoconductive member 10 past the cleaning station 16 which serves to remove any toner particles that were not transferred from the photoconductive member 10 to the paper sheet at the transfer station 14. The photoconductive member 10 is then ready for a new cycle of operation.

If desired the portion 2 can include the scanning mechanism that is used in an electrophotographic office copier for scanning an original graphic to allow the portion 2 to be used as a copier independent of the portions 1 and 3. Referring to the portion 2 of FIG. 1, such scanning mechanism is shown which includes a transparent platen 57 on which a original graphic to be copied is placed and then covered via a cover member 63. The cover 63 and platen 57 are arranged to move to carry the original graphic relative to a slit 58 provided as a part of the scanning arrangement through which light is directed from a light source 62 to an original graphic on platen 57 and reflected therefrom for direction by a mirror and lens system to the photoconductive member 10. Mirrors 59 and 60 plus lens system 61 are provided for this purpose. The platen 57 and the photoconductive member 10 move at the same linear speed for proper production of a latent image at photoconductive drum in accordance with light image produced by the scan made of an original graphic placed at the platen 57. With this arrangement, the apparatus of FIG. 1 provides a dual function apparatus which selectively serves to provide a permanent copy of an original graphic or a permanent copy based on an unfixed toner powder image produced in accordance with electronic signal information provided to the apparatus.

The resolution of a toner image produced at the receptor member 21 of portion 1 using a single stylus array 23 is directly related to the number of styli in the stylus array. Thus, 240 styli per inch provides a toner image on receptor 21 having a resolution of 240 lines of toner deposition/inch. Using 1:1 optical projection, the permanent copy produced by portion 2 based on the toner image at receptor member 21 will also have the same general level of copy resolution, however, the density and sharpness of the images can be substantially improved by the electrographic enhancement of the copying process provided by the portion 2 of FIG. 1. As another embodiment of the present invention, portion 1 of the apparatus of FIG. 1 is arranged so the unfixed toner image produced at the receptor is larger than the light image impinging on the photoconductive member 10. This requires a wider stylus array 23 with the lens system 56 designed to provide the appropriate optical reduction for the desired size of the latent image to be produced at the photoconductive member 10. In addition, the speed at which the receptor 21 moves must be greater than the speed of the photoconductor to provide a speed ratio equal to the optical reduction ratio desired. Such an arrangement provides an image produced on paper by the portion 2 that has a greater resolution per inch than the unfixed toner image produced by portion 1. The arrangement reduces the difficulty involved in manufacturing a high density stylus array in that a less dense stylus array can be used to provide a copy from portion 2 that is of a desired high resolution. By reducing the density of the stylus array, additional types of materials and methods of manufacture can be used for constructing the stylus array in a cost effective manner. Assuming, for example, that a resolution of 240 styli per inch for the plain paper copy is desired and that 200 styli per inch is a comfortable structure for the stylus array, an optical reduction of 6:5 would be used. Should it be necessary to provide apparatus having resolution comparable of 300 styli per inch, and it is difficult to increase the density of the stylus array, the 200 styli per inch styli array could be used with an optical reduction of 3:2 to provide such resolution. As indicated earlier, the speed of the receptor member 21 to the speed of the photoconductor 10 will have a ratio of 3:2 also. Of course, if improvements were attained in the area of stylus array manufacture to make 240 styli per inch economically feasible, the styli array could be changed to such density with the optical reduction remaining the same to attain the desired resolution.

Figure 5:
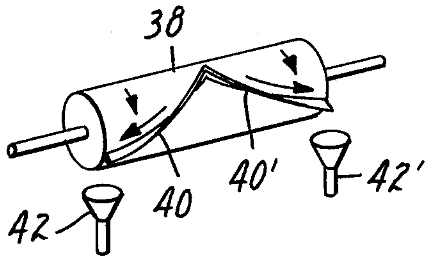
FIG. 5 is a perspective view of another arrangement for the part shown in FIG. 4.

Referring to FIG. 5, a variation of the arrangement of FIG. 4 is shown wherein the dam or flange 40 extends from the center of the surface of shell 38 to one end of the shell 38 with another flange 40' also provided. Flange 40' joins the flange 40 near the center of the surface of shell 38 and extends to the other end of shell 38 with a trough or conduit 42' provided to direct toner powder collected by the 40' back to the toner hopper 30 (FIG. 3). The flange 40, as in the arrangement of FIG. 4, has its trough or conduit 42 provided which directs toner powder collected by the flange 40 back to the toner hopper 30.

Figure 6:
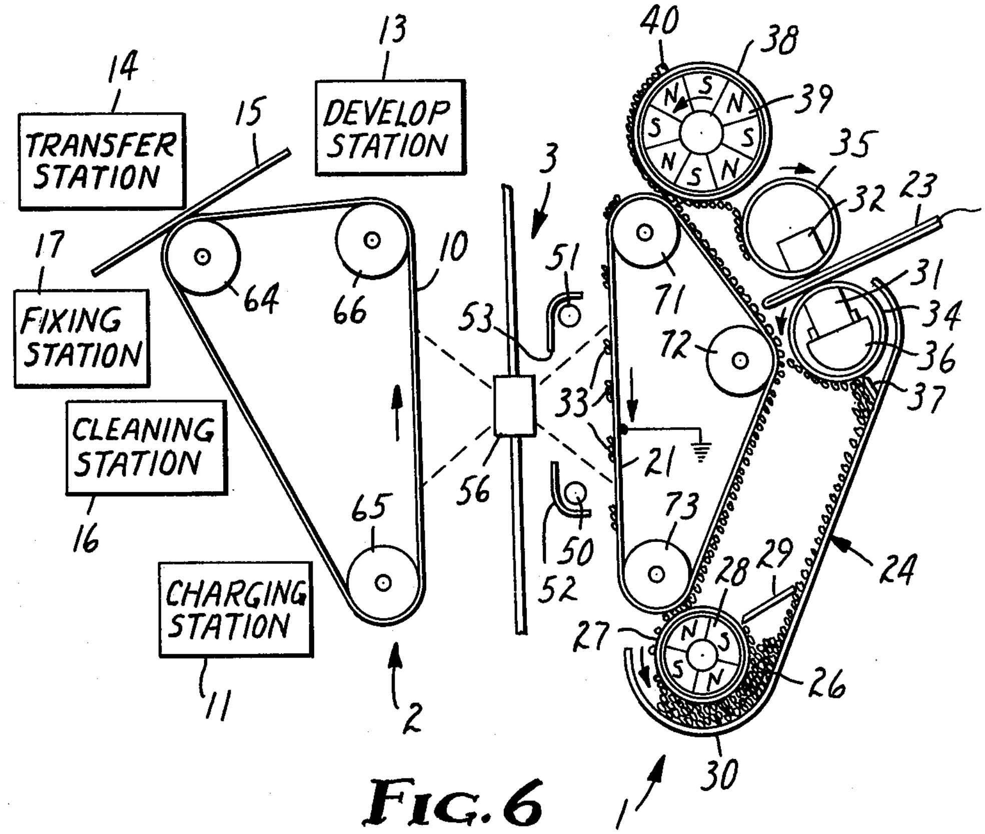
FIG. 6 is a diagrammatic showing of another embodiment of apparatus according to the present invention.

Referring to FIG. 6, another embodiment of apparatus according to the present invention is diagrammatically shown. When applicable, the same reference numerals as used in FIGS. 1, 2 and 3 are utilized to identify like or similar parts. The apparatus of FIG. 6 uses a flexible belt receptor member 21 in the portion 1 which utilizes the teachings of U.S. Pat. No. 3,816,840 to Arthur R. Kotz to produce an unfixed toner powder image at the receptor member 21 in accordance with electrical input signals. Portion 2 is an electrophotographic apparatus similar in structure and operation to that described in connection with FIG. 2, except that the photoconductive member 10 is provided in flexible belt form. The use of the flexible receptor member 21 and the flexible belt type of photoconductive member 10 allows a full frame type of light exposure to be made of an unfused image formed on the flexible receptor member 21 with the resulting light image transferred in full frame form to the photoconductive member 10 via the portion 3 which includes light sources 50 and 51, the reflector 52 for the light sources and lens system 56.

Referring to portion 2 of FIG. 6, it differs from the details given for portion 1 shown in FIGS. 1 and 3 only with respect to the receptor member 21 being in flexible belt form requiring the use of one or more driven rolls, represented at 71–73, to move and direct the receptor member 21 past the toner supply means 24, the stylus electrode 23 and background remover shell 38 and then move the receptor member 21 in its return to the toner supply means 24 so the unfixed toner powder image produced at the electrode 23 will be presented at a flat exposure surface provided by the receptor member 21. The apparatus of FIG. 6 is operated so the unfixed image 33 is exposed to light from the lamps 50 and 51 to provide a full frame exposure of the image. Flash tubes are then used for lamps 50 and 51.

The full frame light image produced by the light exposure of the toner image 33 on the receptor member 21 is passed via the lens system 56 to the photoconductive member 10 of portion 2. The photoconductive member 10, unlike the arrangement shown in FIG. 2, is provided in flexible belt form and is moved and directed by rolls 64–66, one or more of which are driven, so that it presents a flat exposure surface to the light image provided of the toner image at receptor member 21. Like FIG. 2, the portion 2 in FIG. 6 has the various functional stations, in addition to the exposure aspect just discussed, which include a development station 13, transfer station 14, fixing station 17, cleaning station 16 and charging station 11. Prior to receiving a light image of an unfixed toner image from the portion 2 at the receptor 21 of portion 1, the photoconductor member 10 receives a uniform electrostatic charge at the charging station 11. The uniform electrostatic charge is discharged in accordance with the light image that impinges on the photoconductor 10 when the photoconductor 10 is moved counterclockwise to a position for receiving a light image via the lens system 56. As for the apparatus of FIG. 2, the light exposed photoconductor 10 is then presented to the development station where the electrical charge pattern established in accordance with the light image is developed by the deposition of toner powder at the non-light struck areas of the photoconductor 10. A receptor member 15, such as paper or other sheet material, is introduced at the transfer station 14 as the developed toner image reaches the transfer station at which point the toner image on the photoconductor 10 is transferred to the receptor member 15. The receptor 15, as for FIG. 2, is moved to the fixing station 17 of the apparatus where the image is fixed to the receptor member 15 by pressure, heat or a combination of heat and pressure. The photoconductor 10 continues to move and is presented to the cleaning station 16 where any toner remaining on the surface of the photoconductor is removed. The next station to which the photoconductor is presented is the charging station 11 where the first step in the process, the electrostatic charging of the photoconductor, can be carried out again.

If multiple copies of a toner image produced by the first portion 1 are to be made, the receptor member 21 is maintained in the light exposure position until all copies have been made.

As in the case of the apparatus of FIG. 1, the portion 1 of the apparatus of FIG. 6, can be arranged to provide a larger toner image than is desired to be produced by the portion 2 allowing an image to be produced at portion 2 that is greater in resolution than the toner image provided by portion 1. This, as in the case of FIG. 1, requires a lens system 56 that will provide a light image at the photoconductor 10 that is a reduction of the light image received from the receptor member 21 and also allows for simplification of the structure needed to provide the electrode styli array at 23.

I claim:

1. Apparatus for producing a permanent image including:

a first receptor member;

means for producing an unfixed toner powder image on said first receptor member;

means including a photoconductive member for producing a permanent image on a second receptor member using a latent image resulting from a light image received by said photoconductive member; and means adapted for producing a light image of an unfixed toner powder image on said first receptor member and directing it so it is received by said photoconductive member.

2. Apparatus according to claim 1 wherein said first mentioned means includes a stylus array positioned a short distance from said first receptor member and adapted for receiving electrical signals;

a toner powder supply means adapted for providing toner powder to the space between said styli array and said first receptor member, the toner powder at said receptor opposite a stylus of said styli array responding to an electrical signal applied to such stylus, to cause such toner powder to be attracted to said first receptor member;

means for removing toner powder from said first receptor member that is not attracted to said first receptor member in response to electrical signals applied to said stylus array whereby toner powder remaining on said first receptor member provides an unfixed toner powder image.

3. Apparatus according to claim 1 wherein said unfixed toner powder image produced by said first-mentioned means on said first receptor member is larger than said light image of such unfixed toner image received by said photoconductive member by said last-mentioned means of claim 1.

4. Apparatus according to claim 1 further including means for receiving a graphic original and operable to project a light image of said graphic original to said photoconductive member.

5. Apparatus according to claim 1 wherein said first receptor member and said photoconductive member are movable and said means for producing a light image of an unfixed toner powder image at said first receptor member is adapted to produce such light image in a line scan manner.

6. Apparatus according to claim 1 wherein said first receptor member is in the form of a movable endless receptor belt;

said photoconductive member is in the form of an endless photoconductive belt; and said means for producing a light image of an unfixed toner powder image at said first receptor member is adapted to produce such light image in a full frame manner.

* * * * *